United States Patent Office 2,984,666
Patented May 16, 1961

2,984,666
CONDENSED HETEROCYCLIC NITRILES

Newman M. Bortnick, Oreland, and Marian F. Fegley, Mont Clare, Pa., assignors to Rohm & Haas Company, Philadelphia, Pa., a corporation of Delaware No Drawing. Filed June 18, 1958, Ser. No. 742,751

14 Claims. (Cl. 260—251)

This invention deals with specific condensed heterocyclic nitriles as new compositions of matter. It further deals with a method for the preparation of these condensed heterocyclic nitriles.

The compounds of this invention are prepared by reacting a specific heterocyclic compound with hydrocyanic acid in a substantially equimolecular ratio to be more fully explained hereinafter. The heterocyclic reactants may be represented by the formula

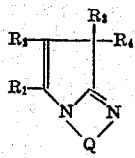

and the products of this invention may be represented by the formula

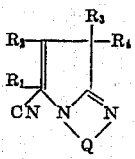

The symbol $R_1$ represents a hydrocarbon group of one to ten carbon atoms, preferably alkyl, aralkyl, cycloalkyl, aryl, and alkaryl. The symbol $R_2$ represents a hydrogen atom or an alkyl group of one to four carbon atoms. The symbols $R_3$ and $R_4$ may be hydrogen or hydrocarbon groups of one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ when taken together with the carbon atom to which they are joined may form a carbocyclic ring containing five to six carbon atoms which in turn may have alkyl substituents containing a total of no more than four additional carbon atoms. The total number of carbon atoms in the groups $R_1$, $R_2$, $R_3$, and $R_4$ should not exceed 20. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

The symbol Q represents a chain of two to three carbon atoms between the two nitrogen atoms to which it is joined. Q may be a straight chain alkylene group, an alkyl-substituted alkylene group, or a cycloalkyl, aryl, or aralkyl group as long as there are no more than two to three carbon atoms between the two primary amino groups. While the upper limit of carbon atoms in Q is not especially critical, about 18 is considered the practical upper limit. Also, while the group Q may contain alkyl substituents, it is necessary that the carbon atom directly attached to the nitrogen which is in turn attached to the carbon atom containing the $R_1$ group, be attached to no more than two carbon atoms.

Typical representations of the Q group include

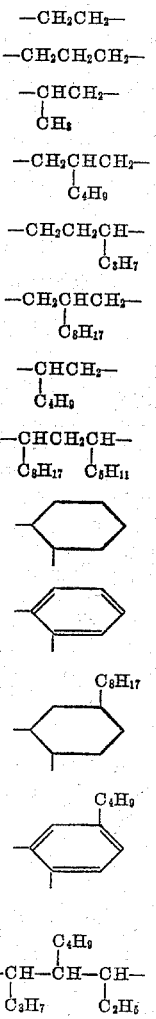

and $$-CH-CH-CH-$$
$$\phantom{-}C_4H_9\phantom{H-CH-}$$
$$\phantom{-CH-}C_3H_7\phantom{-CH-}C_2H_5$$

Illustrative heterocyclic reactants include 2,3-dihydro-5,7,7 - trimethyl - (7H) - imidazo[1,2 - a]pyrrole, 2,3-dihydro - 5,6 - dimethyl - (7H) - imidazo[1,2 - a]pyrrole, 2,3 - dihydro - 5,7 - dimethyl - 7 - hexyl - (7H) -imidazo-[1,2 - a]pyrrole, 7 - methyl - 5,7 - bis(2 - methylpropyl) - 2,3 - dihydro - (7H) - imidazo[1,2 - a]pyrrole, 2,3 - dihydro - 5,7 - dimethyl - 7 - (2,2 - dimethylpropyl) - (7H)-imidazo[1,2-a]pyrrole, 2,3-dihydro-2, (or 3),5,7,7-tetramethyl-(7H)-imidazo[1,2-a]pyrrole, 2(or 3),7-dimethyl - 5,7 - diphenyl - 2,3 - dihydro - (7H) - imidazo-[1,2-a]pyrrole, 2(or 3),5-dimethyl-2,3,7,8,9,9a-hexahydro - (6H) - isoindolo[1,2 - a]imidazole, spiro{3,3-dimethylbicyclo(2.2.1)heptane - 2,7' - [2'(or 3'),5' - dimethyl - 2',3' - dihydro - (7'H) - imidazo[1,2 - a]pyrrole]}, 2(or 3),6,9,9-tetramethyl-2,3,5,6,7,8-hexahydro-(9H) - indolo[1,2 - a]imidazole, 6,8,8 - trimethyl - 2,3, 4,8 - tetrahydropyrrolo[1,2 - a]pyrimidine, spiro{cyclohexane - 1,10' - [2',3',4',6',7',8',9',10' - octahydroindolo-[1,2 - a]pyrimidine]}, 6 - methyl - 2,3,4,7,8,9,10,10a-octahydroisoindolo[1,2 - a]pyrimidine, 6,8 - dimethyl-8 - (2,2 - dimethylpropyl) - 2,3,4,8 - tetrahydropyrrolo-[1,2-a]pyrimidine and 1,3,3-trimethyl-(3H)-pyrrolo[1,2-a]benzimidazole. These reactants may be prepared according to our copending application Serial Number 715,504, filed March 3, 1958.

The present compounds are prepared by reacting an equivalent of the defined heterocyclic reactant with substantially an equivalent of hydrocyanic acid. The present reaction is conducted at atmospheric pressures and at a temperature range of 0° to 150° C., preferably 20° to 100° C., or at superatmospheric pressures at temperatures as high as 325° C. It is necessary to conduct the reaction in a basic medium and since the heterocyclic reactants are already basic in nature, no catalyst is required. However, occasionally it may be advantageous to add small portions of acid, conveniently mineral acids, such as hydrochloric acid, in order to expedite the reaction. However, the amount of acid to be added should always be such that the basic medium is maintained. While no catalyst is actually required, as stated heretofore, it may be advantageous in some instances to supply a cyanide ion generating catalyst in which case the catalyst is employed preferably in amounts of about 0.1 to 20% by weight of the total weight of the reactants. Suitable as a catalyst are alkali metals and their carbonates, the lower alkoxides, oxides, hydroxides, peroxides, and cyanides of the alkali metals and alkaline earth metals, tertiary amines, and quaternary ammonium bases. Actually there may be employed as catalyst any base whose aqueous 0.1 molar solution has a pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium peroxide, magnesium peroxide, potassium cyanide, lithium cyanide, barium cyanide, magnesium cyanide, sodium carbonate, potassium carbonate, trimethylamine, triethylamine, triethanolamine, octyldimethylamine, N-methylmorpholine, benzyltrimethylammonium hydroxide, dibenzyldimethylammonium hydroxide, dodecenyltriethylammonium hydroxide, and the like. The alkali metal cyanides are particularly effective for the instant purposes.

It is advantageous to introduce the hydrocyanic acid at such a rate that reaction occurs promptly and the rate of introduction may be regulated so as to substantially equal the rate of reaction as will be clear to one skilled in the art. Under such circumstances, no adverse side reactions are noticed and high yields are obtained frequently approaching 100 percent. Hydrocyanic acid may be introduced into the reaction mixture in either the gaseous or liquid state as is desired and substantially similar results are obtained in either case.

If desired, a volatile inert organic solvent may be employed in order to obtain maximum reaction benefits. The solvent may be of the hydrocarbon type, such as hexane, heptane, benzene, toluene, and the like, or it may be selected from the class of secondary and tertiary alcohols, ethers, substituted amides, nitriles, and halogenated hydrocarbons, as desired. At the conclusion of the reaction, the product may be isolated by neutralization of any added catalyst, separation from the resulting salt, and removal of volatile solvents or unreacted starting materials by distillation. If desired, the products may be further purified by selective extraction, vacuum distillation, or crystallization as is appropriate and clear to one skilled in the art.

The products of this invention are useful as fungicides, particularly against *Monilinia fructicola* and *Stemphylium sarccinaeforme* in concentrations as low as 0.01 to 0.1% when evaluated according to standard methods. These compounds were also active against the bean beetle and army worm. The present products are, also, useful hypotensive agents without showing any untoward effects. Particularly useful in the above respects is 5 - cyano - 2,3,5,6 - tetrahydro - 5,7,7 - trimethyl - (7H)-pyrrolo[1,2-a]imidazole.

The compounds of this invention have been presented in their free-base form and in this free-base form, they possess the valuable characteristics and concurrent utilities previously referred to. However, it is to be construed that the present invention includes the acid addition salts of these free-base products also. It is desirable, in some instances, to employ the present products in their water-soluble salt form. For instance, in pesticidal applications, it is highly desirable to deal with water-soluble compounds in order that satisfactory spray solutions may be formulated. In other applications, wherein any physiological benefits are desired, it is frequently advantageous to employ the present products in their physiologically acceptable organic salt form in order to provide the stability and physiological tolerance required.

In order to prepare the salt forms of the present compounds, it is necessary only to react these compounds with a stoichiometric amount of the selected acid. The salt formation occurs readily at room temperature without the aid of a catalyst. If solid reactants are employed, it may be advantageous to use an inert volatile solvent such as benzene, toluene, xylene, hexane, heptane, methylene chloride, chloroform, or the like. The solvent can then be readily removed at the conclusion of the reaction by conventional methods. The salt product does not require any further purification although recrystallization from a solvent, such as isooctane, may be resorted to if a product of high purity is demanded.

While the method for the preparation of the salts is believed to be clear to one skilled in the art from the above description, such salt formation may be specifically illustrated by indicating that one takes an equivalent amount of a selected compound of this invention in its free-base form, and then adds a stoichiometric amount of a selected acid which would for instance by 36.5 parts of hydrochloric acid, 98 parts of sulfuric acid, 60 parts of acetic acid, 72 parts of acrylic acid, and the like. The corresponding hydrochloric, sulfuric, acetic, and acrylic acid salts respectively are readily formed. Similarly, other salt products may be prepared.

Typical organic and inorganic acids that may be employed are formic acid, acetic acid, propionic acid, butyric acid, caproic acid, capric acid, lauric acid, myristic acid, palmitic acid, stearic acid, acrylic acid, methacrylic acid, crotonic acid, undecylenic acid, oleic acid, linoleic acid, linolenic acid, ricinoleic acid, propiolic acid, butynoic acid, cyclobutanecarboxylic acid, norcamphane-2-carboxylic acid, benzoic acid, resorcylic acid, oxalic acid, succinic acid, glutaric acid, adipic acid, sebacic acid, salicylic acid, maleic acid, fumaric acid, glutaconic acid, saccharic acid, dodecanedioic acid, octendioic acid, cyclohexaneacetic acid, cyclopentaneacetic acid, tridecanoic acid, hexynedioic acid, phthalic acid, cinnamic acid, benzenesulfonic acid, ethanesulfonic acid, naphthalenesulfonic acid, toluenesulfinic acid, glutamic acid, glyoxalic acid, phenylglyoxalic acid, pyruvic acid, levulinic acid, glycine, aminocaproic acid, hydrochloric acid, hydrobromic acid, sulfuric acid, perchloric acid, carbonic acid, nitric acid, and phosphoric acid.

The compounds of this invention, as well as the method for their preparation, may be more fully understood from the following examples which are offered by way of illustration and not by way of limitation. Parts by weight are used throughout.

EXAMPLE 1

Hydrogen cyanide (7 parts) is added dropwise with stirring to 2,3-dihydro-5,7,7-trimethyl-(7H)-imidazo[1,2-a]pyrrole (30 parts). An exothermic reaction occurs and ice-bath cooling is required in order to keep the temperature below 80° C. Early in the course of this addition, the temperature rises as high as 140° C. before control is achieved. The reaction mixture is then distilled under reduced pressure to give the product, 5-cyano-2,3,5,6-tetrahydro-5,7,7-trimethyl - (7H) - imidazo[1,2-a]pyrrole (30 parts—85% yield), having a boiling point of 66°–69° C. (0.15 mm.), and an $n_D^{25}$ value of 1.4811. The product contains 23.5% nitrogen (23.7% theoretical) and has a neutral equivalent of 175 (177 theoretical).

In a similar fashion, 2,3-dihydro-5,6-dimethyl-(7H)-imidazo[1,2-a]pyrrole gives 5-cyano-5,6-dimethyl-2,3,5,6-tetrahydro-(7H)-imidazo[1,2-a]pyrrole, 2,3-dihydro-5,7-dimethyl-7-(2,2-dimethylpropyl) - (7H) - imidazo[1,2-a]pyrrole gives 5-cyano-5,7-dimethyl-7-(2,2 - dimethylpropyl)-2,3,5,6-tetrahydro-(7H)-imidazo[1,2-a]pyrrole, 2,3-dihydro-2 (or 3), 7-dimethyl-5,7-diphenyl-(7H)-imidazo[1,2-a]pyrrole gives 5-cyano-2 (or 3), 7-dimethyl-5,7,-diphenyl-2,3,5,6-tetrahydro-(7H) - imidazo[1,2-a]pyrrole, spiro{[3,3-dimethylbicyclo(2.2.1)heptane-2,7'-[2'(or 3'), 5'-dimethyl-2',3'-dihydro-(7'H) - imidazo[1,2-a]pyrrole]} gives spiro{[3,3-dimethylbicyclo(2.2.1)heptane-2,7'-[5'-cyano-2'(or 3'),5'-dimethyl-2',3',5',6'-tetrahydro-(7'H)-imidazo[1,2-a]-pyrrole]}, 2,3,5,6,7,8-hexahydro-2(or 3), 6,9,9-tetramethyl-(9H)-indolo[1,2-a]imidazole gives 4a-cyano-2,3,4a,5,6,7,8,8a-octahydro-2(or 3),6,9,9-tetramethyl-(9H)-indolo[1,2-a]imidazole, 2,3,8-tetrahydro-6,8,8-trimethylpyrrolo[1,2-a]pyrimidine gives 6-cyano-2,3,4,6,7,8,-hexahydro-6,8,8-trimethylpyrrolo[1,2-a] - pyrimidine, 6-methyl - 2,3,4,7,8,9,10,10a - octahydroisoindolo[1,2-a]-pyrimidine gives 6-cyano-6-methyl-2,3,6,6a,7,8,9,10,10a-decahydroisoindolo[1,2-a]pyrimidine, 1,3,3 - trimethyl-(3H)-pyrrolo[1,2-a]benzimidazole gives 1-cyano-1,3,3-trimethyl-1,2-dihydro-(3H)-pyrrolo[1,2-a]benzimidazole, and spiro{cyclohexane-1,9'-[2',3',5',6',7',8' - hexahydro-(9'H)-indolo[1,2-a]imidazole]} gives spiro {cyclohexane-1,9'-[4a'-cyano-2',3',4a',5',6',7',8',8a'-octahydro - (9'H)-indolo[1,2-a]imidazole]}.

EXAMPLE 2

*Hydrogenation of 5-cyano-2,3,5,6-tetrahydro-5,7,7-trimethyl-(7H)-imidazo[1,2-a]pyrrole*

5-cyano-2,3,5,6-tetrahydro-5,7,7-trimethyl - (7H) - imidazo-[1,2-a]pyrrole (240 parts) and dry Raney nickel catalyst (10 parts) are heated at 130°–140° C. for 2 hours under hydrogen at 1600 p.s.i.g. at which point slightly more than two moles of hydrogen per mole of the cyano compound has been absorbed and uptake of hydrogen has become quite slow. The reactor is vented, the catalyst is separated by filtration and the filtrate is distilled under reduced pressure to give the product, 5-aminomethyl - 2,3,5,6-tetrahydro-5,7,7-trimethyl - (7H)-imidazo[1,2-a]pyrrole, having a boiling point of 90° C. at 0.4 mm. The product is obtained in a 77% yield (188 parts) and solidifies on standing in the receiver. The product contains 22.8% nitrogen (23.1% theoretical) and has a neutral equivalent of 93.0 (90.5 theoretical).

It is important in this hydrogenation to keep the temperature as low as possible and to terminate the hydrogenation when the theoretical two moles of hydrogen per mole of nitrile has been absorbed. Failing to observe these precautions leads to further uptake of hydrogen and hydrogenolysis of the imidazo-pyrrole system occurs. One of the hydrogenolysis products which can be obtained is 1-(2-aminoethyl) - 2 - aminomethyl-2,4,4 - trimethylpyrrolidine.

*Preparation of 1-(2-aminoethyl)-5-aminomethyl-3,3,5 trimethyl-2-pyrrolidinone*

Water (65 parts) and 5-aminomethyl-2,3,5,6-tetrahydro-5,7,7-trimethyl - (7H) - imidazo[1,2-a]pyrrole (220 parts) are combined and heated under autogenous pressure for 10 hours at 200° C. in an autoclave. A pressure of about 190 p.s.i.g. develops. The autoclave is cooled and vented. Excess water is stripped off under reduced pressure and the product is distilled to give 1-(2-aminoethyl)-5-aminomethyl-3,3,5-trimethyl-2-pyrrolidinone (215 parts). The product has a boiling point of 145°–149° C. at 1.2 mm. and an $n_D^{24}$ value of 1.4980. It contains 21.0% nitrogen (21.1% theoretical).

EXAMPLE 3

*Part A—Hydrolysis without added catalyst*

Water (30 parts) and 5-cyano-2,3,5,6-tetrahydro-5,7,7-trimethyl-(7H)-imidazo[1,2-a]pyrrole (30 parts) are combined and heated at reflux for 22 hours. The vent from the condenser is connected to a gas scrubbing system which has been charged with standard hydrochloric acid. A gentle stream of nitrogen is used to sweep the vent gases through the scrubbing system. In this manner the evolution of ammonia during the course of the reaction is followed. Boiling is discontinued when 85% of the theoretical amount of ammonia had been evolved. The reaction mixture is concentrated and the residue is dissolved in ethanol and decolorized with Nuchar. On cooling, a solid product, having a melting point of 155.5°–157° C., separates. The product is neutral and what dissolves in deionized water is non-conducting. It is identified as 1,6-dioxo-1,2,3,4,6,7,8,8a-octahydro-7,7,8a-trimethylpyrrolo-[1,2-a]pyrazine having the formula

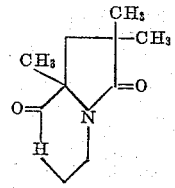

The product contains 14.0% nitrogen (14.3% theoretical), 8.2% hydrogen (8.2% theoretical), 60.9% carbon (61.2% theoretical), and has a molecular weight of 200±3 (196 theoretical). The infrared spectrum is consistent with this structural assignment.

*Part B—Alkaline catalyzed hydrolysis*

A mixture of water (75 parts), sodium hydroxide (24 parts), and 5-cyano-2,3,5,6-tetrahydro-5,7,7-trimethyl-(7H)-imidazo[1,2-a]pyrrole (88.5 parts) is boiled under reflux until ammonia evolution ceases (6 hours). The reaction mixture is carefully neutralized with concentrated hydrochloric acid; the neutralized mixture is concentrated under reduced pressure. Methanol is added to the residue. The mixture is boiled and filtered while hot to separate sodium chloride. The filtrate is again evaporated by stripping under reduced pressure. A solid product, having a melting point of 197°–199° C., remains. This crystalline product is dissolved in ethanol and reprecipitated by addition of ether. Under these conditions, an analytically pure sample is obtained, having a melting point of 202°–203° C. The product contains 55.9% carbon (56.1% theoretical), 8.3% hydrogen (8.5% theoretical), and 12.9% nitrogen (13.1% theoretical). That the product was an amino acid is shown by infrared examination. This infrared study shows in addition that a 5-membered lactam ring is present in the molecule. An aqueous solution of the product ($1.2 \times 10^{-2}$ molar) has a conductivity of 3000 ohms$^{-1}$, a result which is consistent for the amino acid structure. Thus, the product is shown to have the structure 1-(2-aminoethyl)-5-carboxy-3,3,5-trimethyl - 2 - pyrrolidinone. This amino acid is converted to 1,6-dioxo-1,2,3,4,6,7,8,8a-octahydro-7,7,8a-trimethylpyrrolo[1,2-a]pyrazine by heating to 170° C. under 2 mm. pressure. The resulting sublimate is identical with the product which is obtained by hydrolysis of 5-cyano-2,3,5,6-tetrahydro-5,7,7-trimethylimidazo[1,2-a]pyrrole in the absence of added catalyst as shown by melting and mixed melting point determinations.

EXAMPLE 4

*Preparation of 5-ethoxycarbonyl-2,3,5,6-tetrahydro-5,7,7-trimethyl-(7H)-imidazo[1,2-a]pyrrole*

5-cyano-5,7,7-trimethyl - (7H) - imidazo[1,2-a]pyrrole (30 parts) is added dropwise to concentrated sulfuric acid (40 parts) to which has been added just sufficient water to be equivalent to the nitrile which is added. The addition rate is adjusted to keep the reaction temperature below 80° C. The reaction mixture was held at 60° C. for three hours. Ethanol (80 parts) is added and the reaction mixture is boiled under reflux for 16 hours. The reaction mixture is freed of acid by passage over an ethanol-washed bed of anion exchange resin in the free-base form. The resulting effluent is stripped of ethanol to give the desired product, 5-ethoxycarbonyl-2,3,5,6-tetrahydro-5,7,7-trimethyl - (7H) - imidazo[1,2-a]pyrrole, having an $n_D^{25}$ value of 1.4820. A sample of this ester is converted to the picrate in the usual fashion and has a melting point of 117°–117.5° C. after recrystallization from ethanol. It contains 15.51% nitrogen (15.45% theoretical).

We claim:

1. As a composition of matter, a member from the class consisting of the compound having the formula

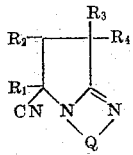

and the acid addition salts thereof, in which $R_1$ taken individually represents a member from the group consisting of alkyl, phenylalkyl, cycloalkyl, phenyl, naphthyl, and alkylphenyl of up to 10 carbon atoms, $R_2$ taken individually represents a member from the group consisting of hydrogen and alkyl of 1 to 4 carbon atoms, $R_3$ and $R_4$ taken individually represent members from the group consisting of alkyl, cycloalkyl, phenylalkyl, phenyl, naphthyl, and alkylphenyl of up to 10 carbon atoms, $R_1$ and $R_2$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_2$ and $R_3$ taken collectively with the carbon atoms to which they are joined form a member from the group consisting of a saturated carbocyclic ring of 5 to 6 carbon atoms and said ring having alkyl substituents consisting of a total of up to 4 carbon atoms, and $R_3$ and $R_4$ taken collectively with the carbon atoms to which they are joined form a member from the group consisting of a saturated carbocyclic ring of 5 to 6 carbon atoms and said ring having alkyl substituents consisting of a total of up to 4 carbon atoms, Q contains a total of up to about 18 carbon atoms and is a member from the group consisting of

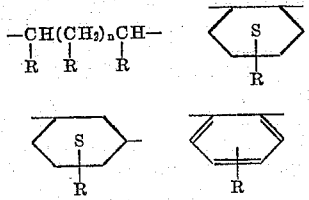

and

in which $n$ is a number from zero to one and R is a member of the group consisting of hydrogen and alkyl.

2. As a composition of matter, the compound having the formula

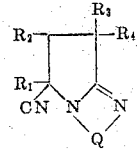

in which $R_1$ is an alkyl group of 1 to 10 carbon atoms, $R_2$ is a hydrogen atom, $R_3$ is an alkyl group of 1 to 10 carbon atoms, $R_4$ is an alkyl group of 1 to 10 carbon atoms, and Q represents ethylene.

3. As a composition of matter, the compound having the formula

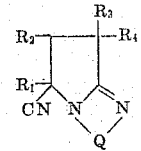

in which $R_1$ and $R_4$ are alkyl groups of 1 to 10 carbon atoms, $R_2$ is a hydrogen atom, and $R_3$ is a methyl group, and Q represents ethylene.

4. As a composition of matter, the compound having the formula

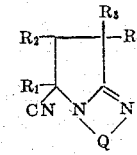

in which $R_1$ and $R_2$ taken collectively with the carbon atoms to which they are joined represent a carbocyclic ring containing 5 to 6 carbon atoms including alkyl substituents containing a total of no more than 4 additional carbon atoms and $R_3$ and $R_4$ are alkyl groups of 1 to 10 carbon atoms, and Q represents ethylene.

5. As a composition of matter, the compound having the formula

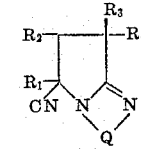

in which $R_1$ is an alkyl group of 1 to 10 carbon atoms, $R_2$ and $R_3$ taken collectively with the carbon atoms to which they are joined form a carbocyclic ring containing 5 to 6 carbon atoms including alkyl substituents containing a total of no more than 4 additional carbon atoms, $R_4$ is an alkyl group of 1 to 10 carbon atoms, and Q represents ethylene.

6. As a composition of matter, the compound having the formula

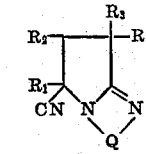

in which $R_1$ is an alkyl group of 1 to 10 carbon atoms, $R_2$ is an alkyl group of 1 to 4 carbon atoms and $R_3$ and $R_4$ taken collectively with the carbon atom to which they are joined may form a carbocyclic ring containing 5 to 6 carbon atoms which in turn may have alkyl substituents containing a total of no more than 4 additional carbon atoms, and Q represents ethylene.

7. As a composition of matter, 5-cyano-2,3,5,6-tetrahydro-5,7,7-trimethyl-(7H)-imidazo[1,2-a]pyrrole.

8. As a composition of matter, 5-cyano-5,6-dimethyl-2,3,5,6-tetrahydro-(7H)-imidazo[1,2-a]pyrrole.

9. As a composition of matter, spiro {cyclohexane-1,9'-[4a' - cyano - 2',3',4a',5',6',7',8',8a',-octahydro-(9'H)-indolo[1,2-a]-imidazole]}

10. As a composition of matter, 6-cyano-2,3,4,6,7,8-hexahydro-6,8,8-trimethylpyrrolo[1,2-a]-pyrimidine.

11. As a composition of matter, 5-cyano-5,7-dimethyl-7 - (2,2 - dimethylpropyl) - 2,3,5,6 - tetrahydro - (7H)-imidazo[1,2-a]pyrrole.

12. A method for the preparation of a compound having the formula

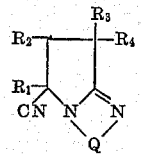

in which $R_1$ taken individually represents a member from from the group consisting of alkyl, phenylalkyl, cycloalkyl, phenyl, naphthyl, and alkylphenyl of up to 10 carbon atoms, $R_2$ taken individually represents a member from the group consisting of hydrogen and alkyl of 1 to 4 carbon atoms, $R_3$ and $R_4$ taken individually represent members from the group consisting of alkyl, cyloalkyl, phenylalkyl, phenyl, naphthyl, and alkylphenyl of up to 10 carbon atoms, $R_1$ and $R_2$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_2$ and $R_3$ taken collectively with the carbon atoms to which they are joined form a member from the group consisting of a saturated carbocyclic ring of 5 to 6 carbon atoms and said ring having alkyl substituents consisting of a total of up to 4 carbon atoms, and $R_3$ and $R_4$ taken collectively with the carbon atoms to which they are joined form a member from the group consisting of a saturated carbocyclic ring of 5 to 6 carbon atoms and said ring having alkyl substituents consisting of a total of up to 4 carbon atoms, Q contains a total of up to about 18 carbon atoms and is a member from the group consisting of

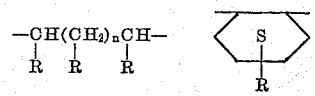

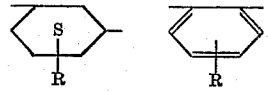

and

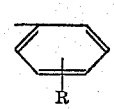

in which $n$ is a number from zero to one and R is a member of the group consisting of hydrogen and alkyl, which comprises bringing together and thereby causing to react hydrocyanic acid and a compound having the formula

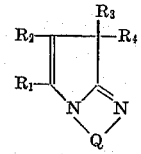

in the temperature range of 0° to 325° C.

13. A method according to claim 12 in which the reaction is conducted at 0° to 150° C. and in the presence of a volatile inert organic solvent.

14. A method according to claim 12 in which hydrocyanic acid is introduced at such a rate to substantially equal the rate of reaction.

No references cited.